No. 886,381. PATENTED MAY 5, 1908.
A. W. LITTLE.
ANIMAL TRAP.
APPLICATION FILED JAN. 28, 1908.
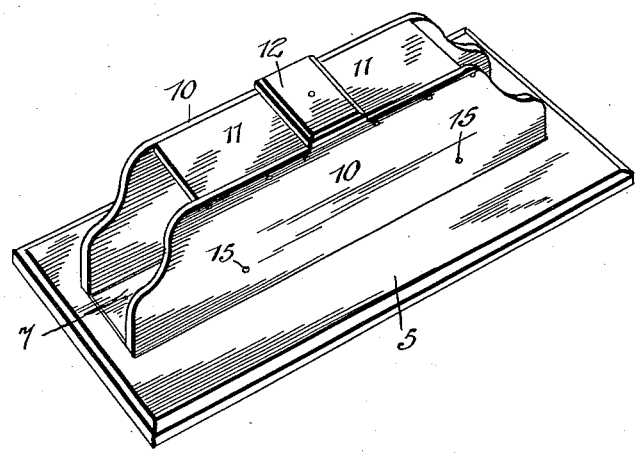
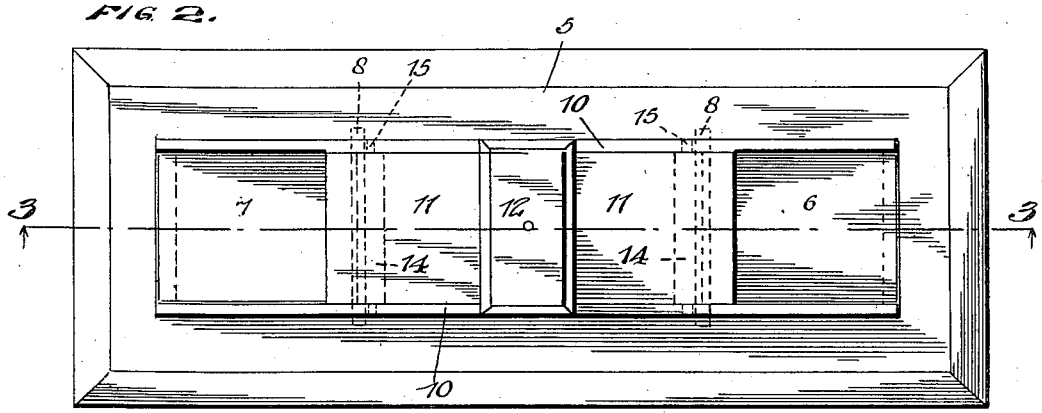
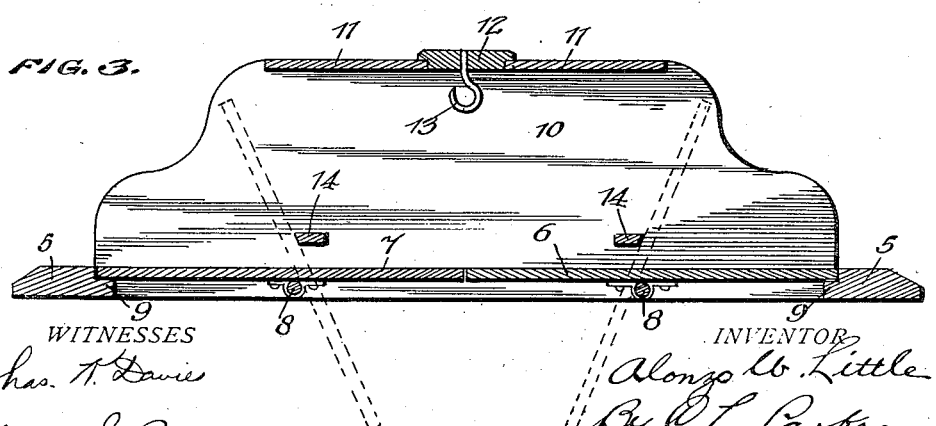
WITNESSES
Chas. N. Davis
Myron T. Cleary
INVENTOR
Alonzo W. Little
By C. L. Parker
Attorney

UNITED STATES PATENT OFFICE.

ALONZO W. LITTLE, OF COLESVILLE, NEW JERSEY.

ANIMAL-TRAP.

No. 886,381.   Specification of Letters Patent.   Patented May 5, 1908.

Application filed January 28, 1908. Serial No. 413,127.

*To all whom it may concern:*

Be it known that I, ALONZO W. LITTLE, citizen of the United States, residing at Colesville, in the county of Sussex and State of New Jersey, have invented certain new and useful Improvements in Animal-Traps, of which the following is a specification.

My invention relates to animal traps of that character embodying pivoted trap doors adapted to swing downwardly when the animal encroaches beyond the pivot point, thus projecting him into a receptacle of suitable character over which the trap is adapted to be placed. Traps of this character are however, open to the objection that the animal is frequently able to back himself if he has not proceeded beyond the pivot point, very impetuously.

The object of my invention, is therefore, to provide certain means which will necessitate the animal landing upon the trap door squarely.

Another object of my invention is to provide such means which will further tend to force the animal downwardly.

With this and other objects in view, my invention specifically resides in the following features of construction, arrangement and operation, to be hereinafter described with reference to the accompanying drawing forming a part of this specification, in which like numerals are used to designate like parts throughout the several figures, and in which Figure 1 is a perspective view of my improved apparatus. Fig. 2 is a top plan view thereof on an enlarged scale, and Fig. 3 is a practical longitudinal sectional view taken therethrough on the line 3—3 of Fig. 2.

In the practical embodiment of my invention, I provide a foundation board 5 having a longitudinal opening therein, in which opening are pivotally mounted a pair of swinging trap doors 6 and 7, by central pivot bars 8, extending between the sides of said opening and having their ends journaled in the foundation board 5. The trap doors 6, are placed end to end and horizontally alined as shown, the outer ends thereof being supported upon shoulders 9 projecting from the foundation board 5, at the ends of its opening and thus necessitating the approach of the animal beyond the pivot 8, when said doors will be swung on said pivot as shown in dotted lines in Fig. 3.

A housing is provided from the opening in which the doors 6 and 7 are mounted, said housing comprising vertical walls 10 extending over the foundation board 5 along the longitudinal edge of its opening, said vertical walls being bridged by a strip 11 secured between the upper edges of said walls 10 and provided centrally with an opening having a removable cover 12 to fit therein, said cover having a centrally depending hook 13, alined above the inner adjacent ends of the trap doors 6, as shown in Fig. 3, and adapted to receive the bait thereon. In this construction, the animal enters between the walls 10, and proceeds beyond the pivot 8 of the trap doors, in order that he may reach the bait hung upon the hook 13. In doing so, he encroaches upon the inner ends of the trap doors 6 and 7, and the same being free to swing downwardly, the animal will, in the majority of cases, be precipitated below the foundation board 5, into any suitable receptacle over which the same is placed, such as a barrel or pail, having a quantity of water or other liquid therein. In this construction, however, the animal in a number of instances, is able to sink his claws into the shorter walls 10 or the adjacent trap door, especially if he proceeds slowly and swings the trap door gradually. He may even retain his balance and retreat to safety. In order to prevent the animal regaining his freedom after once within the walls 10, I provide bridging strips mounted transversely between the vertical walls 10, and arranged above and parallel with the pivot 8. The strips 14 may be stationarily secured between the walls 10, or they may be provided with circularly reduced ends 15, fitting loosely through circular openings in the walls 10, thus allowing said strips 14 to rotate and to assist in throwing the animal off of his balance.

It will be readily seen that in entering between the walls 10 to reach the bait hung upon the hook 13, the animal will necessarily have to crawl or jump over the bridge pieces 14, which in either event, will cause him to land more heavily and more squarely upon the inner ends of the trap doors 6 and 7 than has heretofore been the case. Also, should the animal by any chance, retain a grip upon the bridging piece 14, the outer ends of the trap doors 6 and 7 will precipitate him therefrom when the same moves upwardly thereagainst, as is shown in Fig. 3.

Having fully described my invention, I claim:

1. In an animal trap of the character described, the combination with a pivoted trap door, of an obstruction, in the form of a strip mounted parallel with and above the pivot of said door, in order to force the animal to descend heavily upon the downwardly swinging end thereof, substantially as described.

2. In an animal trap of the character described, the combination with a pivoted trap door, of an obstruction, arranged above, the point of pivot thereof, in order to cause the animal to descend heavily upon the downwardly swinging end of said trap door, substantially as described.

3. In an animal trap of the character described, the combination with a pivoted trap door, of an obstruction in the form of a rotatable strip arranged above the point of pivot of said trap door, in order to force the animal to descend heavily and off his balance, upon the downwardly swinging end of said trap door, substantially as described.

In testimony whereof I affix my signature in presence of two witnesses.

ALONZO W. LITTLE.

Witnesses:
 WILLIAM S. McCOY,
 FLOYD DOTY.